(12) United States Patent
Kurobe et al.

(10) Patent No.: US 6,217,820 B1
(45) Date of Patent: Apr. 17, 2001

(54) METHOD OF MANUFACTURING FERRITE SINTERED BODY

(75) Inventors: Junji Kurobe, Kusatsu; Hideo Ajichi, Omihachiman; Takashi Kodama, Otsu; Takehiro Konoike, Shiga-ken; Akihiro Nakamura, Omihachiman, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/453,260

(22) Filed: Dec. 2, 1999

(30) Foreign Application Priority Data

Dec. 8, 1998 (JP) .................................................. 10-348793
Sep. 14, 1999 (JP) .................................................. 11-261070

(51) Int. Cl.[7] .................................................. C04B 35/03
(52) U.S. Cl. .......................... 264/611; 264/612; 264/613
(58) Field of Search ...................................... 264/611, 612, 264/613; 501/126

(56) References Cited

U.S. PATENT DOCUMENTS

| | | | |
|---|---|---|---|
| 5,770,534 | * | 6/1998 | Hong .......................................... 501/1 |
| 6,113,843 | * | 9/2000 | Aoki et al. ............................. 264/613 |

\* cited by examiner

*Primary Examiner*—Christopher A. Fiorilla
(74) *Attorney, Agent, or Firm*—Ostrolenk, Faber, Gerb & Soffen, LLP

(57) ABSTRACT

A method of manufacturing a ferrite sintered body includes the steps of: adding $B_4C$ in a ferrite raw material and firing the ferrite raw material, whereby the ferrite sintered body has a high $\mu i$ and a high Q, is less irregular in its characteristics, has a high volume resistivity and is capable of preventing deterioration of insulating resistance.

20 Claims, 1 Drawing Sheet

METHOD OF MANUFACTURING FERRITE SINTERED BODY

BACKGROUND OF THE INVENTION

1. Field of the Invention

The present invention relates to a method of manufacturing a ferrite sintered body, and in particular relates to a method of manufacturing a ferrite sintered body which is suitable for use as an inductor such as a laminated chip inductor.

2. Description of the Related Art

Conventionally, various kinds of ferrite have been used as materials for manufacturing inductors such as a magnetic core material and a laminated chip inductor.

In the case of a laminated chip inductor, generally, ferrite layers and electrically conductive material patterns are laminated successively, a coil consisting of the electrically conductive material patterns laminated and combined together are formed between the ferrite layers so as to obtain a laminated body. Then, the laminated body is sintered so as to be formed into a sintered body. Further, external terminals are formed on the sintered body in a manner such that they are connected to the electrically conductive material patterns, thereby producing the desired product. In general, as a ferrite material for forming the laminated chip inductor, there have been in use a series of Ni—Cu—Zn ferrite materials and a series of Ni—Zn ferrite materials. As an electrically conductive material, Ag has been in practical use since it has a large electric conductivity.

With the development of a trend in which electronic devices are made compact in size but have improved performances and increased functions, there has been a demand that the ferrite parts for use in forming the electronic devices should also be made compact in size and be made to have further improved performance.

In order to meet the above requirements, a commonly used method in a case of an inductor material for use in forming a laminated chip inductor, for example, is for a glass to be added to the ferrite raw material, and various experiments have been conducted in order to improve various performances. However, the situation is still that it is difficult to sufficiently improve some ferrite properties such as $\mu i$ (initial magnetic permeability) and Q (inverse of dielectric loss tan δ).

SUMMARY OF THE INVENTION

Accordingly, it is an object of the present invention to provide a method of producing a ferrite sintered body having a high $\mu i$ and a high Q, suitable for use as a kind of inductor such as a laminated chip inductor.

In order to achieve the above object, a method of manufacturing a ferrite sintered body according to the present invention is characterized in that $B_4C$ is added in a ferrite raw material, followed by a firing treatment.

Further, the method is characterized in that the $B_4C$ is added in the ferrite raw material, and Mn or a Mn compound is further added into the ferrite raw material, followed by a firing treatment.

Moreover, the method is characterized in that the $B_4C$ is added in the ferrite raw material in an amount of about 10 to 3000 weight ppm.

Further, the method is characterized in that the amount of Mn or Mn compound added in the ferrite raw material is about 100 to 5000 weight ppm calculated as $Mn_2O_3$.

Moreover, the method is characterized in that the ferrite raw material contains at least two elements selected from the group consisting of Ni, Cu and Zn.

Further, the method is characterized in that the ferrite raw material has a composition in which $Fe_2O_3$ is about 45.0 to 50.0 mol %, ZnO is 0 to about 50.0 mol %, and CuO is 0 to about 20.0 mol %, with the balance being NiO.

In addition, the method is characterized in that the ferrite sintered body is for use as an inductor.

As may be understood from the above description, by adding $B_4C$ in the ferrite raw material followed by a firing treatment, it is possible to obtain a ferrite sintered body having a high $\mu i$ and a high Q.

In particular, using Ni—Cu—Zn ferrite and firing at a temperature of 870° C., it is possible to obtain a ferrite sintered body suitable for use as an inductor whose $\mu i$ is 450 or more and whose Q is 80 or more.

Further, by adding either Mn or Mn compound in addition to the above $B_4C$ in the ferrite raw material, a ferrite sintered body suitable for use as a kind of inductor such as a kind of laminated chip inductor is obtained which has further higher $\mu i$ and Q, a high volume resistivity and is capable of preventing a deterioration of insulating resistance which is possibly caused due to a migration of internal electrodes.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Figure 1:
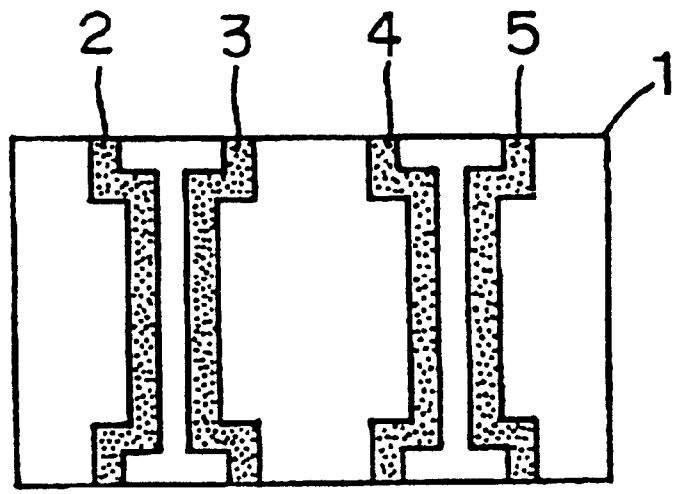
FIG. 1 is a plain view indicating a green sheet made according to an embodiment of the present invention.

Hereinafter, the preferred embodiments of the present invention are explained in detail with reference to the drawings.

The present invention is a method of manufacturing a ferrite sintered body which is characterized in that $B_4C$ is added in a ferrite raw material, and optionally, in addition to $B_4C$, either Mn or a Mn compound is further added into the ferrite raw material.

By adding $B_4C$ to the ferrite raw material, it is possible to improve the low temperature sinterability and to increase $\mu i$ and Q of the sintered ferrite body. As the amount of $B_4C$ to be added, it is preferred that such amount should be in a range of about 10 to 3000 weight ppm. If the amount of $B_4C$ is less than about 10 weight ppm, it will be difficult to obtain a sufficient sinterability at a low temperature. On the other hand, if such amount is larger than about 3000 weight ppm, it will be difficult to increase the $\mu i$ and Q.

Further, by adding either Mn or a Mn compound in addition to the above $B_4C$ to the ferrite raw material, a ferrite sintered body suitable for use as an inductor such as a laminated chip inductor having a higher $\mu i$ and Q, a high volume resistivity and capable of preventing a deterioration of insulating resistance which is possibly caused due to a migration of internal electrodes is obtained. Further, it is preferred that the amount of either Mn or Mn compound should be in a range of about 100 to 5000 weight ppm if converted into $Mn_2O_3$. If the amount converted into $Mn_2O_3$ is less than about 100 weight ppm or the amount is larger than about 5000 ppm, it will be difficult for a ferrite sintered body to obtain an improved volume resistivity and migration resistance.

The timing for adding the $B_4C$ may be at any time point before a prime firing treatment. Nevertheless, in order to inhibit a composition deviation which is possibly caused due to evaporation of added components, it is also preferred that the adding operation is performed after the firing treatment of the ferrite.

Further, the composition of the ferrite raw material of the present invention is not limited. One can select various compositions in accordance with the actual purpose and desired end use. It is preferred that $Fe_2O_3$ is about 45.0 to 50.0 mol % (further preferably, about 48.0 to 49.8 mol %), ZnO is 0 to about 50.0 mol % (further preferably, about 10.0 to 34.0 mol % ), and CuO is 0 to about 20.0 mol % (further preferably, about 6.0 to 15.0 mol %), with the balance being NiO. Further, if the ferrite sintered body is intended for use as a laminated chip inductor, it is preferred to use a Ni—Cu—Zn material as the ferrite raw material in the above composition. By making the composition within the above range, when Ag is used as an internal conductor and a firing treatment is carried out at a temperature of 850 to 920° C., it is possible to obtain a good sinterability, thereby obtaining a laminated chip inductor having a high $\mu i$ and a high Q.

EXAMPLE

In the following, some examples will be given so that the description may be made in more detail.

Example 1

First, powders of $Fe_2O_3$, ZnO, CuO and NiO were prepared as ferrite raw materials. Then each raw material was weighed so that $Fe_2O_3$ is 48.7 mol %, ZnO is 26.9 mol %, CuO is 10.5 mol %, with the balance being NiO. Subsequently, as shown in the following Table 1, a $B_4C$ powder was added in an amount of 0 to 5000 weight ppm, and a wet mixing treatment was carried out in a ball mill, followed by a drying treatment and further by a calcining treatment at a temperature of 700° C. After that, the above raw material treated in the above calcining treatment was wet pulverized in the ball mill. Then, a binder was added so as to form a slurry, followed by a treatment using a doctor blade method, thereby producing some green sheets.

The obtained green sheets were laminated one upon another and pressed together, and cut into toroidal rings each having an outer diameter of 20 mm, an inner diameter of 10 mm and a thickness of 2 mm. Afterwards, a firing treatment was conducted at a temperature of 870° C. for 2 hours, thereby obtaining a ferrite sintered body.

Next, a measurement was carried out to measure $\mu i$ and Q of the thus obtained ferrite sintered body, under a frequency of 100 kHz, with the use of an impedance analyzer. The results of the measurement are shown in Table 1. In Table 1 and all other Tables, a sample number having a mark * is not included in the range of the present invention.

TABLE 1

| Sample No. | Amount of $B_4C$ (weight ppm) | $\mu i$ | Q |
| --- | --- | --- | --- |
| *1 | 0 | 390 | 72 |
| 2 | 5 | 402 | 76 |
| 3 | 10 | 450 | 80 |
| 4 | 100 | 491 | 90 |
| 5 | 200 | 624 | 95 |
| 6 | 500 | 826 | 90 |
| 7 | 1000 | 882 | 83 |
| 8 | 3000 | 450 | 80 |
| 9 | 5000 | 170 | 72 |

As may be clearly understood from Table 1, by adding $B_4C$ in the ferrite raw material, in particular by controlling the amount of added $B_4C$ within a range of 10 to 3000 weight ppm as shown in sample numbers 3 to 8, it is possible to obtain good ferrite characteristics indicating that $\mu i$ is 450 or more and that Q is 80 or more.

Example 2

Powders of $Fe_2O_3$, ZnO, CuO and NiO were prepared as ferrite raw materials. Then, an amount of each raw material was taken so that $Fe_2O_3$ is 48.7 mol %, ZnO is 26.9 mol %, CuO is 10.5 mol %, with the balance being NiO. Subsequently, a wet mixing treatment was carried out in a ball mill, followed by a drying treatment and further by a calcining treatment at a temperature of 700° C. After that, as shown in the following Table 2, $B_4C$ powder was added in an amount of 0 to 5000 ppm into the above raw material treated in the above calcining treatment, and the mixture thus obtained was wet pulverized in a ball mill. Then, a binder was added so as to form a slurry, followed by a treatment using a doctor blade method, thereby producing some green sheets.

The obtained green sheets were laminated one upon another and pressed together, and cut into toroidal rings each having an outer diameter of 20 mm, an inner diameter of 10 mm and a thickness of 2 mm. Afterwards, a firing treatment was conducted at a temperature of 870° C. for 2 hours, thereby obtaining a ferrite sintered body.

Next, a measurement was carried out to measure $\mu i$ and Q of the thus obtained ferrite sintered body, at a frequency of 100 kHz, with the use of an impedance analyzer. The results of the measurement are shown in Table 2.

TABLE 2

| Sample No. | Amount of $B_4C$ (weight ppm) | $\mu i$ | Q |
| --- | --- | --- | --- |
| *11 | 0 | 390 | 72 |
| 12 | 5 | 407 | 79 |
| 13 | 10 | 455 | 82 |
| 14 | 100 | 563 | 93 |
| 15 | 200 | 698 | 101 |
| 16 | 500 | 894 | 95 |
| 17 | 1000 | 933 | 87 |
| 18 | 3000 | 455 | 82 |
| 19 | 5000 | 250 | 74 |

As may be clearly understood from Table 2, by controlling the amount of added $B_4C$ within a range of 10 to 3000 weight ppm as shown in sample numbers 13 to 18, it is possible to obtain good ferrite characteristics indicating that $\mu i$ is 455 or more and that Q is 82 or more.

Example 3

Powders of $Fe_2O_3$, ZnO, CuO and NiO were prepared as ferrite raw materials. Then, each raw material was taken so that $Fe_2O_3$ is 48.7 mol %, ZnO is 26.9 mol %, CuO is 10.5 mol %, with the balance being NiO. Subsequently, a wet mixing treatment was carried out in a ball mill, followed by a drying treatment and further by a calcining treatment at a temperature of 700° C. The raw materials treated in the above calcining treatment were wet pulverized in a ball mill. After that, as shown in the following Table 3, $B_4C$ powder was added in an amount of 0 to 5000 ppm into the thus treated raw materials, and a wet mixing was again conducted in the ball mill. Then, a binder was added so as to form a slurry, followed by a treatment using a doctor blade method, thereby producing some green sheets.

The obtained green sheets were laminated one upon another and pressed together, and cut into toroidal rings each having an outer diameter of 20 mm, an inner diameter of 10 mm and a thickness of 2 mm. Afterwards, a firing treatment was conducted at a temperature of 870° C. for 2 hours, thereby obtaining a ferrite sintered body.

Next, a measurement was carried out to measure $\mu i$ and Q of the thus obtained ferrite sintered body, at a frequency of 100 kHz, with the use of an impedance analyzer. The results of the measurement are shown in Table 3.

TABLE 3

| Sample No. | Amount of $B_4C$ (weight ppm) | $\mu i$ | Q |
| --- | --- | --- | --- |
| *21 | 0 | 380 | 72 |
| 22 | 5 | 410 | 79 |
| 23 | 10 | 452 | 82 |
| 24 | 100 | 540 | 92 |
| 25 | 200 | 680 | 98 |
| 26 | 500 | 885 | 94 |
| 27 | 1000 | 920 | 84 |
| 28 | 3000 | 453 | 81 |
| 29 | 5000 | 240 | 73 |

As may be clearly understood from Table 3, by controlling the amount of added $B_4C$ within a range of 10 to 3000 weight ppm as shown in sample numbers 23 to 28, it is possible to obtain good ferrite characteristics indicating that $\mu i$ is 452 or more and that Q is 81 or more.

As may be understood from the above examples 1 to 3, by adding $B_4C$ in an amount of 10 to 3000 weight ppm into the Ni—Cu—Zn ferrite and further by a firing treatment at a temperature of 870° C., obtained in a ferrite sintered body having $\mu i$ of 450 or more and Q of 80 or more, which is quite suitable for use as an inductor.

Example 4

Powders of $Fe_2O_3$, ZnO, CuO and NiO were prepared as ferrite raw materials. Then, an amount of each raw material was taken so that the $Fe_2O_3$ is 48.7 mol %, ZnO is 26.9 mol %, CuO is 10.5 mol %, with the balance being NiO. Subsequently, as shown in the following Table 4, $B_4C$ power was added in an amount of 200 to 1000 weight ppm, and further, $Mn_2O_3$, Mn metal or $Mn(CH_3COO)_2$ were added in an amount of 0 to 7000 weight ppm if converted into $Mn_2O_3$. Then, a wet mixing treatment was carried out in a ball mill, followed by a drying treatment and further by a calcining treatment at a temperature of 700° C. After that, the raw material treated in the above calcining treatment was wet pulverized in the ball mill. Then, a binder was added so as to form a slurry, followed by a treatment using a doctor blade method, thereby producing some green sheets.

Then, the obtained green sheets were laminated one upon another and pressed together, and cut into toroidal rings each having an outer diameter of 20 mm, an inner diameter of 10 mm and a thickness of 2 mm. Afterwards, a firing treatment was conducted at a temperature of 870° C. for 2 hours, thereby obtaining a ferrite sintered body.

Next, a measurement was carried out to measure $\mu i$ and Q of the thus obtained ferrite sintered body, at a frequency of 100 kHz, with the use of an impedance analyzer. The results of the measurement are shown in Table 4.

TABLE 4

| Sample No. | Amount of $B_4C$ (weight ppm) | Additive | Amount when converted into $Mn_2O_3$ (weight ppm) | $\mu i$ | Q |
| --- | --- | --- | --- | --- | --- |
| 31 | 200 | $Mn_2O_3$ | 0 | 624 | 95 |
| 32 | 200 | $Mn_2O_3$ | 100 | 705 | 92 |
| 33 | 200 | $Mn_2O_3$ | 2000 | 710 | 106 |
| 34 | 500 | $Mn(CH_3COO)_2$ | 2000 | 916 | 98 |
| 35 | 500 | $Mn_2O_3$ | 7000 | 490 | 68 |
| 36 | 1000 | $Mn_2O_3$ | 0 | 882 | 83 |
| 37 | 1000 | Mn | 500 | 935 | 93 |
| 38 | 1000 | $Mn_2O_3$ | 2000 | 972 | 98 |
| 39 | 1000 | $Mn_2O_3$ | 5000 | 920 | 92 |
| 40 | 1000 | $Mn(CH_3COO)_2$ | 7000 | 510 | 79 |

As may be clearly understood from Table 4, by adding either Mn or a Mn compound in addition to the $B_4C$, and by controlling the amount added within a range of 100 to 5000 weight ppm if converted into $Mn_2O_3$ as shown in sample numbers 32 to 34 and sample numbers 37 to 39, it is possible to obtain good ferrite characteristics indicating that $\mu p$ is 705 or more and that Q is 92 or more.

Example 5

Powders of $Fe_2O_3$, ZnO, CuO and NiO were prepared as ferrite raw materials. Then, an amount of each raw material was taken so that $Fe_2O_3$ is 48.7 mol %, ZnO is 26.9 mol %, CuO is 10.5 mol %, with the balance being NiO. Subsequently, as shown in the following Table 5, $B_4C$ powder was added in an amount of 1000 weight ppm and further, $Mn_2O_3$ was added in an amount of 0 to 7000 weight ppm. Then, a wet mixing treatment was carried out in a ball mill, followed by a drying treatment and further by a calcining treatment at a temperature of 700° C. After that, the raw material treated in the above calcining treatment was wet pulverized in the ball mill. Then, a binder was added so as to form a slurry, followed by a treatment using a doctor blade method, thereby producing some green sheets.

Then, the obtained green sheets were laminated one upon another and pressed together, and cut into toroidal rings each having an outer diameter of 20 mm, an inner diameter of 10 mm and a thickness of 2 mm. Afterwards, a firing treatment was conducted at a temperature of 870° C. for 2 hours, thereby obtaining a ferrite sintered body.

Next, a measurement was carried out to measure the volume resistivity log $\pi(\Omega \cdot cm)$ of the thus obtained ferrite sintered body, with the results of the measurement shown in Table 5.

TABLE 5

| Sample No. | Amount of $B_4C$ (weight ppm) | Amount of $Mn_2O_3$ (weight ppm) | Volume resistivity log ρ (Ω·cm) |
|---|---|---|---|
| 41 | 1000 | 0 | 7.8 |
| 42 | 1000 | 50 | 7.8 |
| 43 | 1000 | 100 | 8.3 |
| 44 | 1000 | 200 | 9.8 |
| 45 | 1000 | 500 | 10.8 |
| 46 | 1000 | 1000 | 11.3 |
| 47 | 1000 | 2000 | 11.4 |
| 48 | 1000 | 5000 | 8.6 |
| 49 | 1000 | 7000 | 7.4 |

As may be clearly understood from Table 5, by adding $Mn_2O_3$ in addition to the $B_4C$, and by controlling the amount of added $Mn_2O_3$ within a range of 100 to 5000 weight ppm as shown in sample numbers 43 to 48, it is possible to improve the volume resistivity of a ferrite sintered body.

Example 6

At first, powders of $Fe_2O_3$, ZnO, CuO and NiO were prepared as ferrite raw materials. Then, an amount of each raw material was taken so that $Fe_2O_3$ is 48.7 mol %, ZnO is 26.9 mol %, CuO is 10.5 mol %, with the balance being NiO. Subsequently, as shown in the following Table 6, $B_4C$ powder was added in an amount of 1000 weight ppm and further, $Mn_2O_3$ was added in an amount of 0 to 7000 weight ppm. Then, a wet mixing treatment was carried out in a ball mill, followed by a drying treatment and further by a calcining treatment at a temperature of 700° C. After that, the raw material treated in the above calcining treatment was wet pulverized in the ball mill. Then, a binder was added so as to form a slurry, followed by a treatment using a doctor blade method, thereby producing some green sheets.

Then, as shown in FIG. 1, Ag paste is applied to one of the thus obtained green sheets 1, so as to form by means of printing several internal conductors 2, 3, 4 and 5 constituting an inductor array patterns. After that, on both the upper and lower surfaces of the green sheet in which the internal conductors have been formed, a plurality of green sheets not printed with the internal conductors are laminated thereon, followed by a pressing treatment to thereby obtain a laminated body. Subsequently, a firing treatment was carried out at a temperature of 870° C. for two hours.

Figure 2:
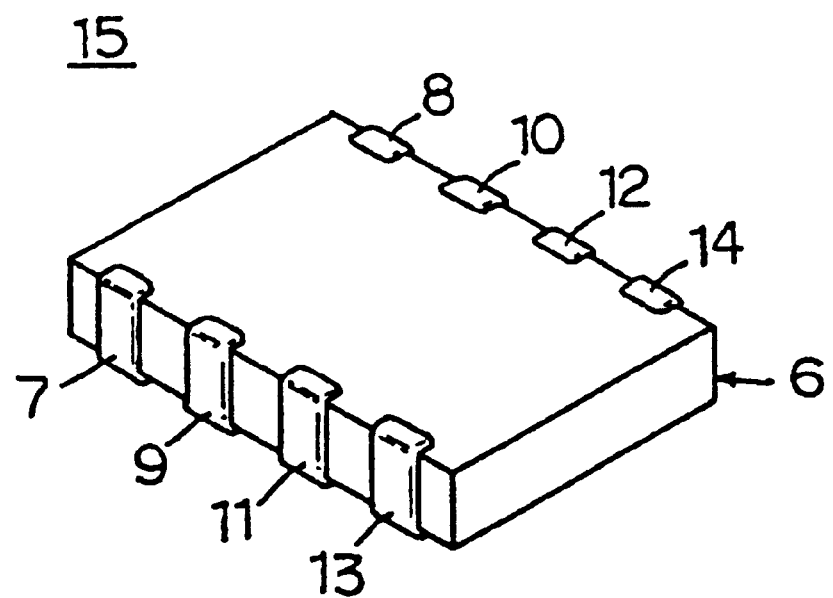
FIG. 2 is a perspective view showing the outer appearance of an inductor array manufactured with the use of a green sheet shown in FIG. 1.

Next, as shown in FIG. 2, on the outer surface of the sintered body 6, Ag paste is applied to some areas thereof on which the internal conductors 2 to 5 (refer to FIG. 1) are exposed, followed by a firing treatment in the atmosphere at a temperature of 800° C. for 30 minutes, thereby forming external conductors 7, 8, 9, 10, 11, 12, 13 and 14.

A moisture resistance loading test was conducted on the inductor array 15 obtained in the above manner (chip size: $3.2^L \times 1.6^W 1.0^T$ mm). The results of the test are shown in Table 6.

The moisture resistance loading test was carried out at a temperature of 85° C. and under a relative humidity of 85%, by continuously applying a DC voltage of 50 V for 2000 hours in positions between the external conductors 7 and 8, the external conductors 9 and 10, the external conductors 11 and 12, the external conductors 13 and 14. Then, in the midst of the test, a voltage of 50 V was applied in positions between the external conductors 7 and 8, the external conductors 9 and 10, the external conductors 11 and 12, the external conductors 13 and 14, so as to measure insulating resistance, thereby calculating the variation of resistance value of the ferrite sintered body.

TABLE 6

| | | | Insulating resistance value ($\times 10^9 \Omega$) | | | | |
|---|---|---|---|---|---|---|---|
| Sample No. | Amount of $B_4C$ (weight ppm) | Amount of $Mn_2O_3$ (weight ppm) | initial period (0 hr.) | 100 hrs. | 500 hrs. | 1000 hrs. | 2000 hrs. |
| 51 | 1000 | 0 | 66 | 60 | 4.2 | 0.21 | 0.01 |
| 52 | 1000 | 100 | 40 | 38 | 39 | 35 | 38 |
| 53 | 1000 | 1000 | 42000 | 39000 | 45000 | 44000 | 40000 |
| 54 | 1000 | 5000 | 83 | 83 | 83 | 83 | 83 |
| 55 | 1000 | 7000 | 33 | 29 | 35 | 0.13 | 0.0033 |

As may be clearly understood from Table 6, by adding $Mn_2O_3$ in addition to the above $B_4C$, and by controlling the amount of added $Mn_2O_3$ within a range of 100 to 5000 weight ppm as shown in sample numbers 52 to 54, it is possible to obtain an inductor capable of preventing deterioration of the insulating resistance of a ferrite sintered body during the moisture resistance loading test, inhibiting migration of Ag conductor towards the ferrite sintered body, thereby ensuring excellent reliability.

Although it has been described in the above description that the ferrite raw material has a composition in which $Fe_2O_3$ is 48.7 mol %, ZnO is 26.9 mol %, CuO is 10.5 mol %, with the balance being NiO, the present invention is not be limited by the above composition. In fact, it is also possible for Ni—Cu—Zn ferrite to have other compositions. For instance, the ferrite may contain at least two of Ni, Cu and Zn, such as an Ni—Zn ferrite, thereby obtaining the same effects as described in the above, i.e., obtaining a high μi and a high Q.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A method of manufacturing a ferrite sintered body comprising the steps of:
    combining $B_4C$ with a ferrite raw material; and
    firing the ferrite raw material.
2. A method of manufacturing a ferrite sintered body according to claim 1, further comprising the step of combining Mn or a Mn compound with the ferrite raw material before the firing step.
3. A method of manufacturing a ferrite sintered body according to claim 2, wherein the $B_4C$ is about 10 to 3000 weight ppm of the ferrite raw material.

4. A method of manufacturing a ferrite sintered body according to claim 3, wherein the Mn or Mn compound is about 100 to 5000 weight ppm in terms of $Mn_2O_3$ of the ferrite raw material.

5. A method of manufacturing a ferrite sintered body according to claim 4, wherein the ferrite raw material comprises at least two members selected from the group consisting of Ni, Cu and Zn.

6. A method of manufacturing a ferrite sintered body according to claim 5, wherein the ferrite raw material comprises about 45.0 to 50.0 mol % of $Fe_2O_3$, 0 to about 50.0 mol % of ZnO, 0 to about 20.0 mol % of CuO and the balance of NiO.

7. A method of manufacturing a ferrite sintered body according to claim 5, wherein the ferrite raw material comprises about 48 to 49.8 mol % of $Fe_2O_3$, about 10 to 34 mol % of ZnO, about 6 to 15 mol % of CuO and the balance of NiO.

8. A method of manufacturing a ferrite sintered body according to claim 1, wherein the $B_4C$ is about 10 to 3000 weight ppm of the ferrite raw material.

9. A method of manufacturing a ferrite sintered body according to claim 8, wherein the ferrite raw material comprises about 45.0 to 50.0 mol % of $Fe_2O_3$, 0 to about 50.0 mol % of ZnO, 0 to about 20.0 mol % of CuO and the balance of NiO.

10. A method of manufacturing a ferrite sintered body according to claim 9, wherein the ferrite raw material comprises about 48 to 49.8 mol % of $Fe_2O_3$, about 10 to 34 mol % of ZnO, about 6 to 15 mol % of CuO and the balance of NiO.

11. A method of manufacturing a ferrite sintered body according to claim 1, wherein the ferrite raw material comprises at least two members selected from the group consisting of Ni, Cu and Zn.

12. A method of manufacturing a ferrite sintered body according to claim 1, wherein the step of combining $B_4C$ with a ferrite raw material is conducted before the step of firing the ferrite raw material.

13. A method of manufacturing a ferrite sintered body according to claim 1, wherein the ferrite raw material is fired before the combining step.

14. In a method of manufacturing an inductor which comprising the step of preparing a ferrite sintered body and combining the ferrite sintered body with an electrically conductive element, the improvement which comprises preparing the ferrite sintered body by the steps of:

combining $B_4C$ with a ferrite raw material; and firing the ferrite raw material.

15. The method of manufacturing an inductor according to claim 14, wherein Mn or a Mn compound is combined with the ferrite raw material before the firing step.

16. The method of manufacturing an inductor according to claim 14, wherein the $B_4C$ is about 10 to 3000 weight ppm of the ferrite raw material.

17. The method of manufacturing an inductor according to claim 14, wherein the ferrite raw material comprises about 45.0 to 50.0 mol % of $Fe_2O_3$, 0 to about 50.0 mol % of ZnO, 0 to about 20.0 mol % of CuO and the balance of NiO.

18. The method of manufacturing an inductor according to claim 14, wherein the ferrite raw material comprises at least two members selected from the group consisting of Ni, Cu and Zn.

19. The method of manufacturing an inductor according to claim 14, wherein the step of combining $B_4C$ with a ferrite raw material is conducted before the step of firing the ferrite raw material.

20. The method of manufacturing an inductor according to claim 14, wherein the ferrite raw material is fired before the combining step.

* * * * *